(12) United States Patent
Kotoyori (10) Patent No.: US 10,839,549 B2
(45) Date of Patent: Nov. 17, 2020

(54) APPARATUS AND METHOD FOR ESTIMATING POSITION OF IMAGE CAPTURING UNIT

(71) Applicant: CANON KABUSHIKI KAISHA, Tokyo (JP)

(72) Inventor: Takuya Kotoyori, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 122 days.

(21) Appl. No.: 16/003,607

(22) Filed: Jun. 8, 2018

(65) Prior Publication Data

US 2018/0357785 A1    Dec. 13, 2018

(30) Foreign Application Priority Data

Jun. 12, 2017  (JP) ................................. 2017-115309

(51) Int. Cl.
*G06T 7/73* (2017.01)
*G06T 11/00* (2006.01)

(52) U.S. Cl.
CPC ............... *G06T 7/73* (2017.01); *G06T 11/00* (2013.01); *G06T 2200/28* (2013.01); *G06T 2207/10004* (2013.01); *G06T 2207/30244* (2013.01)

(58) Field of Classification Search
CPC ................. G02B 21/06; G02B 21/367; G02B 2027/014; G06F 3/0304; G06F 3/0346;
(Continued)

(56) References Cited

U.S. PATENT DOCUMENTS 5,818,954 A * 10/1998 Tomono ................. G06F 3/013
382/115
8,787,614 B2    7/2014 Choi
(Continued)

FOREIGN PATENT DOCUMENTS

JP          5296746 B2    9/2013

OTHER PUBLICATIONS

Georg Klein, David Murray; Parallel Tracking and Mapping for Small AR Workspaces; Active Vision Laboratory Department of Engineering Science University of Oxford.
(Continued)

*Primary Examiner* — Aklilu K Woldemariam
(74) *Attorney, Agent, or Firm* — Canon U.S.A., Inc. IP Division (57) ABSTRACT

An information processing apparatus includes an image acquisition unit that acquires an image obtained by capturing a real space using an image capturing unit, an estimation unit configured to, based on a feature extracted from the image, estimate a position of the image capturing unit, a generation unit configured to, based on the feature and the estimated position of the image capturing unit, generate a map of the feature in the real space, a parameter acquisition unit that acquires an environmental parameter indicating an environment of the real space, a recording unit that records a first environmental parameter acquired at a first time point when the map is generated, in association with the map, and a determination unit configured to, based on the first environmental parameter and a second environmental parameter acquired at a second time point after the first time point, determine whether the map can be used.

19 Claims, 7 Drawing Sheets

(58) Field of Classification Search
CPC ........ G06F 3/0487; G06F 3/013; G06T 11/00;
G06T 11/20; G06T 2200/28; G06T
2207/30244; G06T 2207/10012; G06T
7/73; G06T 19/20; G06T 1/0007; G06T
7/593; G06T 7/70; G06T 2207/10004;
G06T 7/33; G06T 2200/32; G06T
2207/30181; G06T 3/40; G06T 11/60;
G06T 19/003; G06T 2207/10048; G06T
7/66; H04L 12/2803; G09G 3/001; G06K
9/00201; G06K 9/00671; G06K 9/3241;
G06K 9/52; G06K 9/0061; G06K
9/00604; G06K 9/2036; G06K 9/58;
G06K 2009/2045; G06K 9/6298; G06K
9/036; G06K 9/6254; G06K 9/6256;
H04N 5/23219; G05D 1/0274; G05D
1/0027; G05D 1/0038; G05D 1/0016;
G01R 33/5608; H04W 4/029; H04W
4/21; G05B 23/0221; B60R 21/013
USPC ....... 382/100, 115, 153, 195, 141, 173, 299;
345/660
See application file for complete search history.

(56) References Cited

U.S. PATENT DOCUMENTS

| | | | | |
|---|---|---|---|---|
| 9,807,725 | B1* | 10/2017 | Vitus | G01S 1/00 |
| 2003/0117148 | A1* | 6/2003 | Wuidart | G06K 19/073 |
| | | | | 324/617 |
| 2005/0135667 | A1* | 6/2005 | Saarela | G06K 9/036 |
| | | | | 382/141 |
| 2007/0088550 | A1* | 4/2007 | Filev | G06K 9/6298 |
| | | | | 704/245 |
| 2011/0184685 | A1* | 7/2011 | Tanigawa | G06K 9/00691 |
| | | | | 702/95 |
| 2011/0187746 | A1* | 8/2011 | Suto | G02B 27/0172 |
| | | | | 345/634 |
| 2011/0306419 | A1* | 12/2011 | Miyazaki | G06F 21/35 |
| | | | | 463/36 |
| 2012/0050524 | A1* | 3/2012 | Rinner | G06T 3/40 |
| | | | | 348/117 |
| 2012/0050525 | A1* | 3/2012 | Rinner | G06T 7/33 |
| | | | | 348/117 |
| 2012/0155775 | A1* | 6/2012 | Ahn | G05D 1/0272 |
| | | | | 382/195 |
| 2012/0188283 | A1* | 7/2012 | Ohashi | G06K 9/6254 |
| | | | | 345/660 |
| 2013/0090133 | A1* | 4/2013 | D' Jesus Bencci | H04W 4/029 |
| | | | | 455/456.2 |
| 2015/0254881 | A1* | 9/2015 | Duan | G06T 11/20 |
| | | | | 345/660 |
| 2015/0264534 | A1* | 9/2015 | Liu | G01S 19/49 |
| | | | | 455/456.1 |
| 2015/0294157 | A1* | 10/2015 | Hasegawa | G06K 9/00691 |
| | | | | 382/153 |
| 2015/0346722 | A1* | 12/2015 | Herz | G05D 1/0027 |
| | | | | 701/2 |
| 2017/0017830 | A1* | 1/2017 | Hanai | G06K 9/00671 |
| 2017/0281283 | A1* | 10/2017 | Siegler | A61B 17/28 |
| 2018/0150974 | A1* | 5/2018 | Abe | G06K 9/6256 |

OTHER PUBLICATIONS

Jakob Engel, Thomas Schops, Daniel Cremers ; LSD-SLAM: Large-Scale Director Monocular SLAM; Technical University Munich ; pp. 1-16.

* cited by examiner

APPARATUS AND METHOD FOR ESTIMATING POSITION OF IMAGE CAPTURING UNIT

BACKGROUND

Field of the Disclosure

The present disclosure relates to an apparatus and a method for estimating the position of an image capturing unit using an image obtained by capturing a real space, and relates to a medium for storing a program for causing a computer to execute the method.

Description of the Related Art

As a technique for mixing a real space and a virtual space in real time, a mixed reality (MR) technique and an augmented reality (AR) technique are known. These techniques seamlessly mix the real space and a virtual space that is created by a computer. Then, these techniques are expected to be applied to various fields such as assembly assistance for displaying a work procedure or the state of wiring on a real image in a superimposed manner when assembly work is performed, and surgical assistance for displaying the state of the inside of a body on the body surface of a patient in a superimposed manner.

As an apparatus for causing an observer to feel as if a virtual object exists in the real space, there is a video see-through type information processing apparatus. The information processing apparatus captures the real space using an image capturing unit such as a video camera and displays a combined image, obtained by superimposing a virtual object on the captured image, in real time on a display unit such as a display, thereby presenting the combined image to an observer. Generally, as such an information processing apparatus, a mobile information terminal, which is a tablet terminal including a video camera on its back surface, or a video see-through type head-mounted display (HMD) is used.

Further, such an information processing apparatus needs to perform self-position estimation for calculating and estimating the position of the information processing apparatus (i.e., an image capturing unit) in the real space for the mixed reality experience time. If the self-position estimation is performed with high accuracy at this time, the processing load becomes high. Thus, techniques for maintaining the accuracy of self-position estimation while reducing the processing load at the mixed reality experience time are studied. As these techniques, conventionally, a technique for creating a map in advance regarding an experience area (see U.S. Pat. No. 8,787,614, for example), and a technique for performing self-position estimation with reference to a map at the time of an experience (see Japanese Patent No. 5296746, for example) are studied.

In the conventional techniques described above, however, in a case where the environment of the real space differs greatly between the time when a map is created (first time point) and the time when mixed reality is experienced (second time point) after the time when the map is created, the accuracy of the estimation of the position of an image capturing unit decreases.

SUMMARY

One or more aspects of the present disclosure is directed to a mechanism capable of, in a case where the environment of a real space differs greatly between the time when a map is created (first time point) and the time when mixed reality is experienced (second time point) after the map is created, preventing a decrease in the position estimation accuracy of an image capturing unit.

According to an aspect of the present disclosure, an information processing apparatus includes an image acquisition unit configured to acquire an image obtained by capturing a real space using an image capturing unit, an extraction unit configured to extract a feature from the image, an estimation unit configured to, based on the feature, estimate a position of the image capturing unit in the real space, a generation unit configured to, based on the feature and the estimated position of the image capturing unit, generate a map of the feature in the real space, a parameter acquisition unit configured to acquire an environmental parameter indicating an environment of the real space, a recording unit configured to record a first environmental parameter, which is the environmental parameter acquired at a first time point when the map is generated, in association with the map, and a determination unit configured to, based on the first environmental parameter and a second environmental parameter, which is the environmental parameter acquired at a second time point after the first time point, determine whether the map can be used.

Further features of the present disclosure will become apparent from the following description of exemplary embodiments with reference to the attached drawings.

DESCRIPTION OF THE EMBODIMENTS

With reference to the drawings, exemplary embodiments of the present disclosure will be described below.

First, a first exemplary embodiment of the present disclosure is described.

Figure 1:
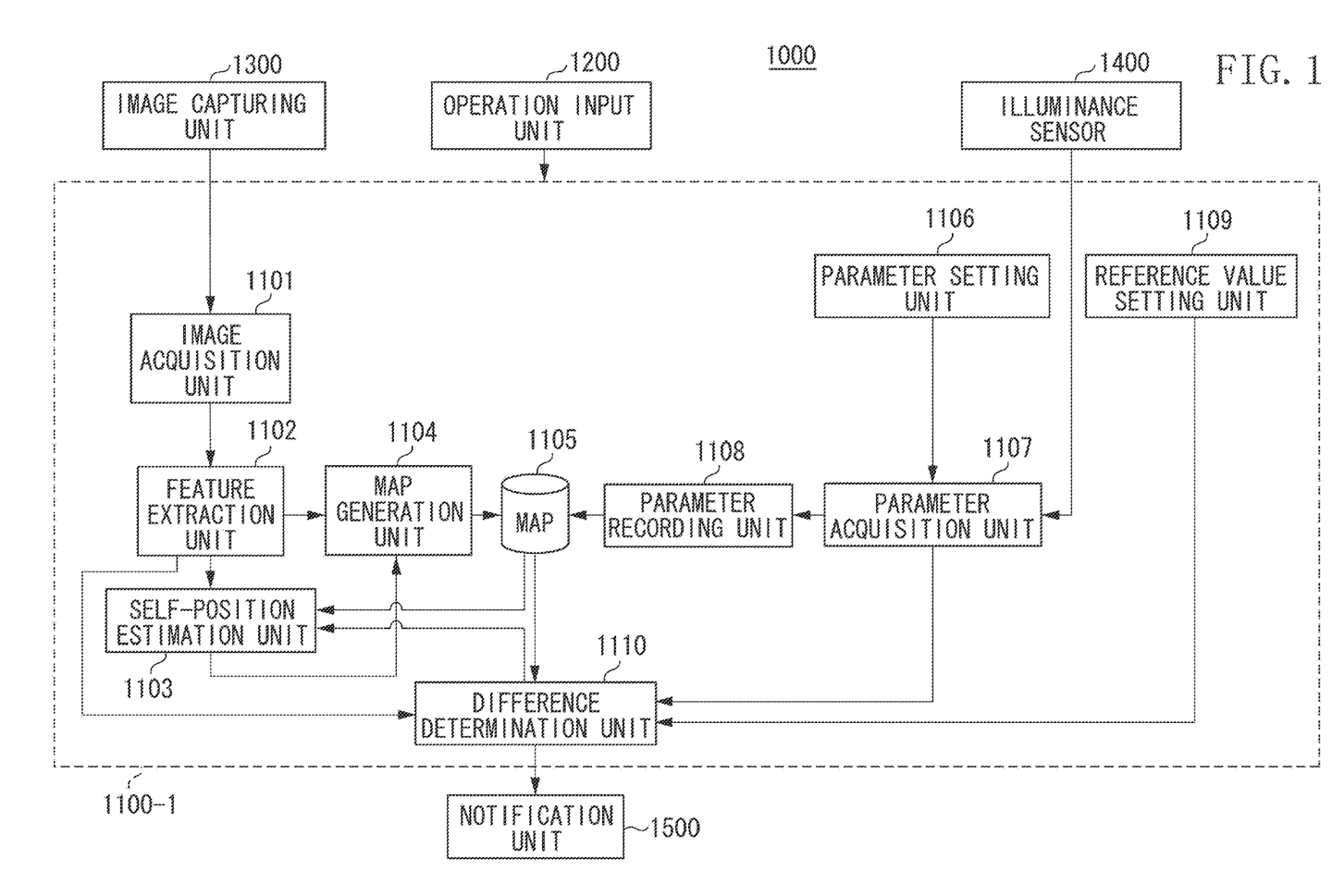
FIG. 1 is a block diagram illustrating an example of a functional configuration of an information processing system according to one or more aspects of the present disclosure.

FIG. 1 is a block diagram illustrating an example of a functional configuration of an information processing system 1000 according to the first exemplary embodiment. As illustrated in FIG. 1, the information processing system 1000 according to the present exemplary embodiment includes an information processing apparatus 1100, an operation input unit 1200, an image capturing unit 1300, an illuminance sensor 1400, and a notification unit 1500. In this specification, the information processing apparatus 1100 illustrated in FIG. 1 is referred to as an "information processing apparatus 1100-1". Further, as illustrated in FIG. 1, the information processing apparatus 1100-1 includes functional units such as an image acquisition unit 1101, a feature extraction unit 1102, a self-position estimation unit 1103, a map generation unit 1104, a map 1105, a parameter setting unit 1106, a parameter acquisition unit 1107, a parameter recording unit 1108, a reference value setting unit 1109, and a difference determination unit 1110.

The operation input unit 1200 inputs information to the information processing apparatus 1100-1 according to an operation of an observer as a user.

Based on control of the information processing apparatus 1100-1, the image capturing unit 1300 captures an image regarding a real space.

Based on control of the information processing apparatus 1100-1, the illuminance sensor 1400 detects illuminance of the real space. In the present exemplary embodiment, an example is described where information of the illuminance is acquired as an environmental parameter indicating the environment of the real space. The environmental parameter according to the present exemplary embodiment, however, is not limited thereto.

Next, the information processing apparatus 1100-1 is described.

Based on input information from the operation input unit 1200, the image acquisition unit 1101 acquires an image regarding the real space from the image capturing unit 1300. The feature extraction unit 1102 extracts a feature in the image from the image acquired by the image acquisition unit 1101.

When a map is generated (first time point), the self-position estimation unit 1103 performs self-position estimation for estimating the position of the image capturing unit 1300 in the real space, using the feature extracted by the feature extraction unit 1102. Further, at a time of mixed reality experience (second time point) after the map is generated (first time point), the self-position estimation unit 1103 performs self-position estimation for estimating the position of the image capturing unit 1300 in the real space, using the feature, extracted by the feature extraction unit 1102 at the time of the experience, and map information obtained from the map 1105.

Using the feature extracted by the feature extraction unit 1102 and the position of the image capturing unit 1300 estimated by the self-position estimation unit 1103, the map generation unit 1104 generates the map 1105 of the feature in the real space.

Based on input information from the operation input unit 1200, the parameter setting unit 1106 sets an environmental parameter indicating the environment of the real space as an environmental condition. More specifically, in the present exemplary embodiment, the parameter setting unit 1106 sets information of the illuminance as the environmental parameter.

According to the environmental parameter set by the parameter setting unit 1106, the parameter acquisition unit 1107 acquires an environmental parameter indicating the environment of the real space. More specifically, in the present exemplary embodiment, the parameter acquisition unit 1107 acquires information of the illuminance as the environmental parameter.

The parameter recording unit 1108 records the environmental parameter (first environmental parameter) acquired by the parameter acquisition unit 1107 when the map is generated (first time point), in association with the map 1105. More specifically, in the present exemplary embodiment, the parameter recording unit 1108 records information of the illuminance acquired as the first environmental parameter by the parameter acquisition unit 1107, in association with the map 1105. To record the environmental parameter in association with the map 1105, a form may be used in which the parameter recording unit 1108 records the environmental parameter within the map 1105, or a form may be used in which the parameter recording unit 1108 records the environmental parameter as information separate from the map 1105.

Based on input information from the operation input unit 1200, the reference value setting unit 1109 sets a reference value (acceptable value), which is a criterion for the determination of the difference determination unit 1110, as an environmental condition. The difference determination unit 1110 determines whether the difference between the environmental parameter (first environmental parameter) recorded in association with the map 1105 and the environmental parameter (second environmental parameter) acquired by the parameter acquisition unit 1107 at the time of mixed reality experience (second time point) is less than or equal to the reference value set by the reference value setting unit 1109. If the difference between the first and second environmental parameters is not less than or equal to the reference value (i.e., if the difference between the first and second environmental parameters is greater than the reference value), it is assumed that the environment of the real space differs greatly between the time when the map is generated (first time point) and the time when the mixed reality is experienced (second time point), and the accuracy of self-position estimation performed by the self-position estimation unit 1103 decreases. In this case, the difference determination unit 1110 controls the notification unit 1500 to notify the user of a warning that the accuracy of self-position estimation performed by the self-position estimation unit 1103 may decrease.

If the difference determination unit 1110 determines that the difference between the first and second environmental parameters is not less than or equal to the reference value set by the reference value setting unit 1109 (i.e., if the difference determination unit 1110 determines that the difference between the first and second environmental parameters is greater than the reference value), then based on control of the difference determination unit 1110, the notification unit 1500 notifies the user of a warning that the accuracy of self-position estimation performed by the self-position estimation unit 1103 may decrease. For example, the notification unit 1500 can employ a form in which the notification unit 1500 displays the warning to notify the user. The present exemplary embodiment is not limited to the form in which the notification unit 1500 displays the warning to notify the user. Alternatively, for example, a form in which the notification unit 1500 outputs the warning to the functional components of the information processing apparatus 1100-1 to notify the user, and a form in which the notification unit 1500 outputs the warning to an external apparatus to notify the user are also applicable. Further, the example in FIG. 1 illustrates a form in which the notification unit 1500 is provided outside the information processing apparatus 1100-1. The present disclosure, however, is not limited to this form. Alternatively, a form in which the notification unit 1500 is provided within the information processing apparatus 1100-1 is also applicable to the present disclosure.

Figure 2:
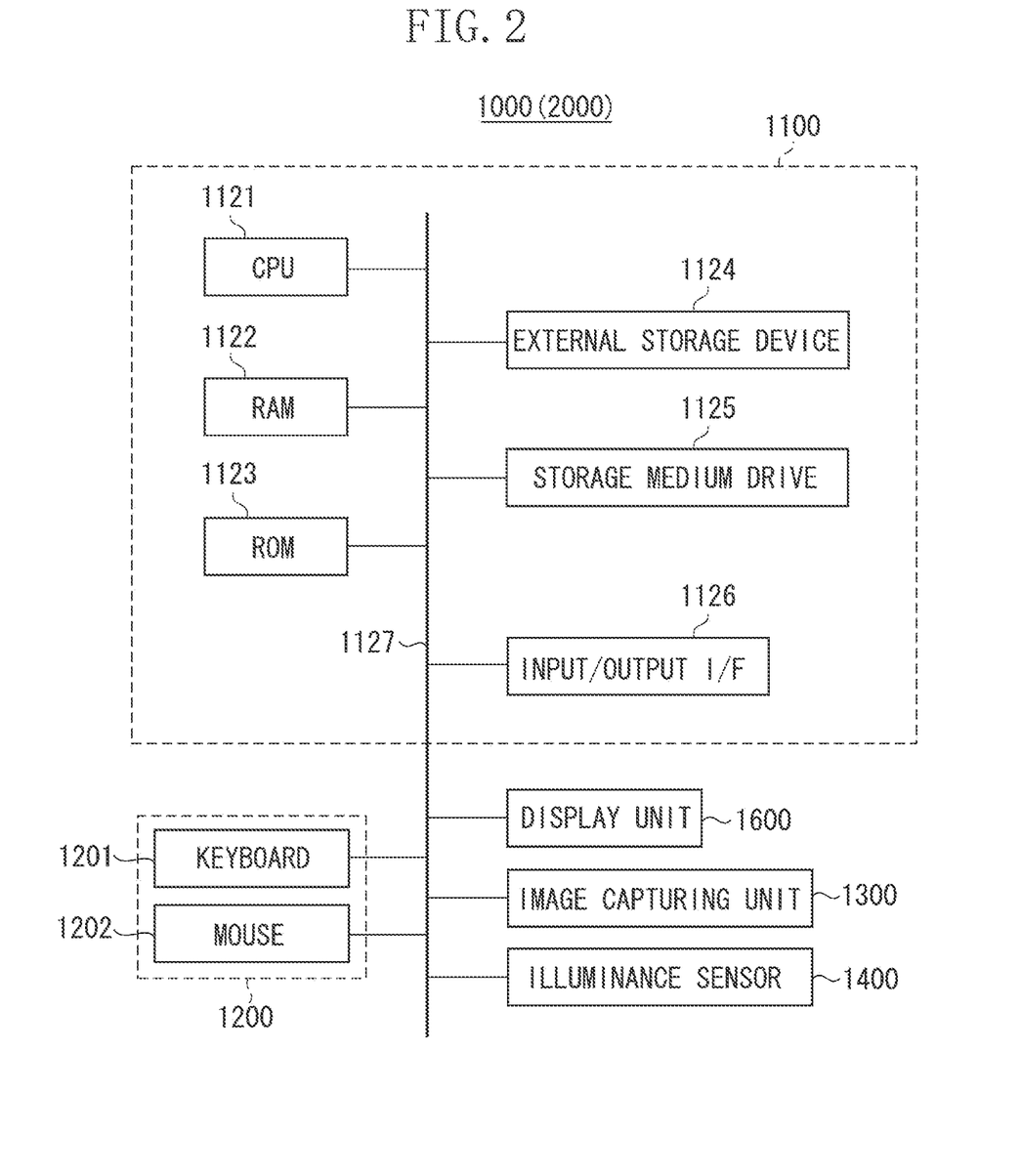
FIG. 2 is a block diagram illustrating an example of a hardware configuration of the information processing system according to one or more aspects of the present disclosure.

FIG. 2 is a block diagram illustrating an example of a hardware configuration of the information processing system 1000 according to the first exemplary embodiment of the present disclosure. In FIG. 2, components similar to those illustrated in FIG. 1 are designated by the same signs, and are not described in detail here.

As illustrated in FIG. 2, the information processing apparatus 1100 includes hardware components such as a central processing unit (CPU) 1121, a random-access memory (RAM) 1122, a read-only memory (ROM) 1123, an external storage device 1124, a storage medium drive 1125, an input/output interface (I/F) 1126, and a bus 1127.

The CPU 1121 performs overall control of the devices (hardware components) connected to the CPU 1121 via the bus 1127, thereby controlling the operation of the information processing apparatus 1100. The CPU 1121 reads and executes a program stored in the ROM 1123, which is a read-only memory. In the present exemplary embodiment, for example, an operating system (OS), programs for processes according to the present exemplary embodiment, and device drivers are stored in the ROM 1123. The CPU 1121 temporarily stores the program and the like in the RAM 1122, which is a random-access memory, and appropriately executes the stored program and the like.

The external storage device 1124 stores, for example, information obtained by control and processing performed by the CPU 1121. The storage medium drive 1125 is a device for reading and writing from and to a storage medium.

Based on control of the CPU 1121, the input/output I/F 1126 inputs from an external device (display unit 1600 or operation input unit 1200) an input signal in a format that can be processed by the information processing apparatus 1100. Further, based on control of the CPU 1121, the input/output I/F 1126 outputs an output signal in a format that can be processed by an external device (display unit 1600).

In FIG. 2, a keyboard 1201 and a mouse 1202 are provided as a form of the operation input unit 1200 illustrated in FIG. 1. Further, in FIG. 2, a display unit 1600 is provided as a form of the notification unit 1500 illustrated in FIG. 1.

A description is given of an example of a correspondence relationships between the functional components of the information processing apparatus 1100-1 illustrated in FIG. 1 and the hardware components of the information processing system 1000 illustrated in FIG. 2.

For example, the functional components 1101 to 1110 of the information processing apparatus 1100-1 illustrated in FIG. 1 are realized by the CPU 1121 illustrated in FIG. 2 loading a program stored in the ROM 1123 into the RAM 1122 and executing the program. For example, to configure hardware as an alternative to a software process using the CPU 1121, a form is also applicable in which a calculation unit and a circuit unit corresponding to the processing of the functional components 1101 to 1110 of the information processing apparatus 1100-1 illustrated in FIG. 1 are configured.

Figure 3:
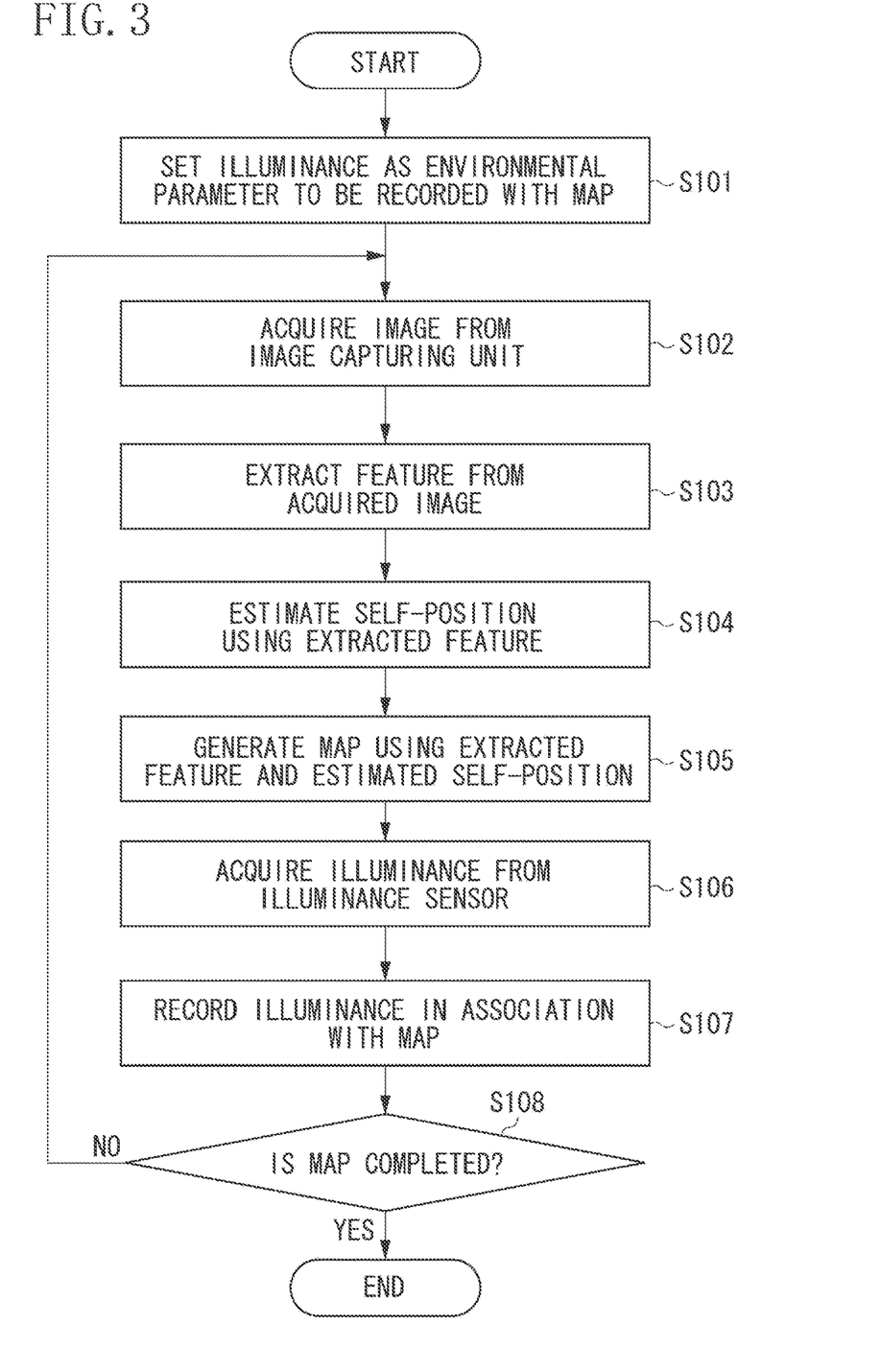
FIG. 3 is a flowchart illustrating an example of a processing procedure performed by an information processing apparatus according to one or more aspects of the present disclosure when a map is generated (first time point).
Figure 4:
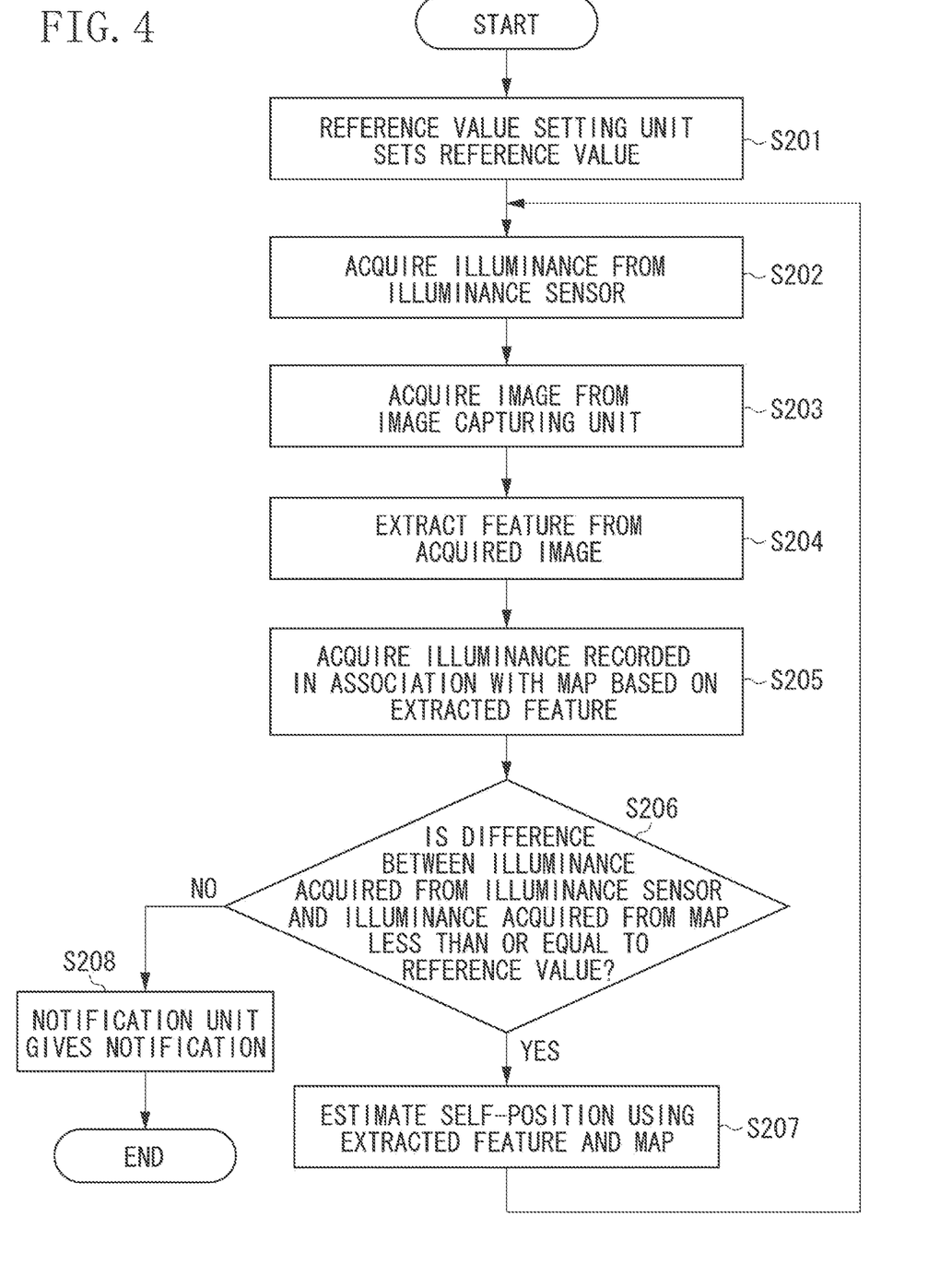
FIG. 4 is a flowchart illustrating an example of a processing procedure performed by the information processing apparatus according to one or more aspects of the present disclosure at a time of mixed reality experience (second time point).

Next, with reference to FIGS. 3 and 4, a description is given of the processing procedure of an information processing method performed by the information processing apparatus 1100-1 illustrated in FIG. 1.

FIG. 3 is a flowchart illustrating an example of a processing procedure performed by the information processing apparatus 1100-1 according to the first exemplary embodiment when the map is generated (first time point).

When the processing in the flowchart illustrated in FIG. 3 is started, first, in step S101, based on input information from the operation input unit 1200, the parameter setting unit 1106 sets information of the illuminance as an environmental parameter indicating the environment of the real space.

Next, in step S102, based on input information from the operation input unit 1200, the image acquisition unit 1101 acquires an image regarding the real space from the image capturing unit 1300.

Next, in step S103, the feature extraction unit 1102 extracts a feature in the image from the image acquired in step S102. At this time, as a specific processing technique in step S103, any known technique may be used. See Klein, G., Murray, D.: Parallel tracking and mapping for small AR workspaces. In: Intl. Symp. on Mixed and Augmented Reality (ISMAR), 2007 (hereinafter, "literature 1") and LSD-SLAM: Large-Scale Direct Monocular SLAM, J. Engel, T. Schops, D. Cremers, European Conference on Computer Vision (ECCV), 2014 (hereinafter, "literature 2"), for example.

Next, in step S104, using the feature extracted in step S103, the self-position estimation unit 1103 performs self-position estimation for estimating the position of the image capturing unit 1300 in the real space when the map is generated (first time point). As a specific processing technique in step S104, any known technique may be used (see literature 1 and literature 2, for example).

Next, in step S105, using the feature extracted in step S103 and the position of the image capturing unit 1300 estimated in step S104, the map generation unit 1104 generates the map 1105 of the feature in the real space. As a specific processing technique in step S105, any known technique may be used (see literature 1, literature 2, and U.S. Pat. No. 8,787,614, for example).

Next, in step S106, according to the environmental parameter set by the parameter setting unit 1106, the parameter acquisition unit 1107 acquires information of the illuminance as an environmental parameter indicating the environment of the real space from the illuminance sensor 1400. The information of the illuminance acquired in step S106 corresponds to the first environmental parameter acquired when the map is generated (first time point).

Next, in step S107, the parameter recording unit 1108 records the information of the illuminance corresponding to the first environmental parameter acquired in step S106, in association with the map 1105 generated in step S105. At this time, the information of the illuminance may be recorded regarding all points on the map 1105, or recorded regarding any point on the map 1105. Alternatively, when the position of the image capturing unit 1300 is estimated by the self-position estimation, and a feature point is sufficiently estimated, images termed "key frames" may be acquired from a moving image, and the information of the illuminance may be recorded with respect to each of the acquired key frames. Alternatively, a plurality of maps 1105 may be present. In this case, the information of the illuminance is recorded with respect to each of the maps 1105.

Next, in step S108, the information processing apparatus 1100-1 (e.g., map generation unit 1104) determines whether the map 1105 is completed. As a specific processing technique in step S108, any known technique may be used (see patent literature 1, for example) in addition to a determination by the user or the lapse of a predetermined time. As a result of the determination in step S108, if the map 1105 is not yet completed (NO in step S108), the processing returns to step S102. Then, the processes of step S102 and the subsequent steps are performed again.

On the other hand, as a result of the determination in step S108, if the map 1105 is completed (YES in step S108), the processing in the flowchart illustrated in FIG. 3 ends.

FIG. 4 is a flowchart illustrating an example of ae processing procedure performed by the information processing apparatus 1100-1 according to the first exemplary embodiment of the present disclosure at the time of mixed reality experience (second time point).

When the processing in the flowchart illustrated in FIG. 4 is started, first, in step S201, based on input information from the operation input unit 1200, the reference value setting unit 1109 sets a reference value (acceptable value), which is a criterion for the determination of the difference determination unit 1110. The reference value set in step S201 may be, for example, a value optionally set by the user or a value obtained by experiment.

Next, in step S202, according to the environmental parameter set by the parameter setting unit 1106, the parameter acquisition unit 1107 acquires information of the illuminance as an environmental parameter indicating the environment of the real space from the illuminance sensor 1400. The information of the illuminance acquired in step S202 corresponds to the second environmental parameter acquired at the time of mixed reality experience (second time point).

Next, in step S203, based on input information from the operation input unit 1200, the image acquisition unit 1101 acquires an image regarding the real space from the image capturing unit 1300.

Next, in step S204, the feature extraction unit 1102 extracts a feature in the image from the image acquired in step S203. At this time, as a specific processing technique in step S204, any known technique may be used (see literature 1 and literature 2, for example).

Next, in step S205, based on the feature extracted in step S204, the difference determination unit 1110 acquires, from the map 1105, information of the illuminance (first environmental parameter) recorded regarding a point matching the extracted feature most.

Next, in step S206, the difference determination unit 1110 determines whether the difference between the information of the illuminance (first environmental parameter) acquired in step S205 and the information of the illuminance (second environmental parameter) acquired in step S202 is less than or equal to the reference value set in step S201.

As a result of the determination in step S206, if the difference between the first and second environmental parameters is less than or equal to the reference value (YES in step S206), the processing proceeds to step S207. The processing proceeds to step S207 in a case where it is considered that the environment of the real space does not change greatly between the time when the map is generated (first time point) and the time when mixed reality is experienced (second time point).

In step S207, using the feature extracted in step S204 and map information obtained from the map 1105, the self-position estimation unit 1103 performs self-position estimation for estimating the position of the image capturing unit 1300 in the real space at the time of mixed reality experience (second time point). As a specific processing technique in step S207, any known technique may be used (see literature 1 and literature 2, for example). Then, if the process of step S207 is completed, the processing returns to step S202. Then, the processes of step S202 and the subsequent steps are performed again.

On the other hand, as a result of the determination in step S206, if the difference between the first and second environmental parameters is not less than or equal to the reference value (i.e., if the difference is greater than the reference value) (NO in step S206), the processing proceeds to step S208. The processing proceeds to step S208 in a case where the environment of the real space differs greatly between the time when the map is generated (first time point) and the time when mixed reality is experienced (second time point), and it is assumed that the accuracy of self-position estimation performed by the self-position estimation unit 1103 decreases.

In step S208, based on control of the difference determination unit 1110, the notification unit 1500 notifies the user of a warning that the accuracy of self-position estimation performed by the self-position estimation unit 1103 may decrease. Then, if the process of step S208 is completed, the processing in the flowchart illustrated in FIG. 4 ends.

In the above description of the first exemplary embodiment, information of the illuminance is acquired as an environmental parameter indicating the environment of the real space. In a first variation of the first exemplary embodiment, information of the temperature is acquired as the environmental parameter. In the first variation, a form is employed in which a temperature sensor is applied instead of the illuminance sensor 1400 illustrated in FIG. 1, and the parameter setting unit 1106 sets information of the temperature as the environmental parameter. Further, in other processes in the first variation, a form is employed in which "the information of the temperature" is applied instead of "the information of the illuminance" in the first exemplary embodiment.

In a second variation of the first exemplary embodiment, information of the internal temperature of the image capturing unit 1300 is acquired as an environmental parameter indicating the environment of the real space. In the second variation, a form is employed in which a temperature sensor is applied within the image capturing unit 1300 instead of the illuminance sensor 1400 illustrated in FIG. 1, and the parameter setting unit 1106 sets information of the internal temperature of the image capturing unit 1300 as the environmental parameter. Further, in other processes in the second variation, a form is employed in which "the information of the internal temperature of the image capturing unit 1300" is applied instead of "the information of the illuminance" in the first exemplary embodiment. In the second variation, the information of the internal temperature of the image capturing unit 1300 recorded in step S107 in FIG. 3 may not need to correspond to points on the map 1105.

In a third variation of the first exemplary embodiment, information of the humidity is acquired as an environmental parameter indicating the environment of the real space. In the third variation, a form is employed in which a humidity sensor is applied instead of the illuminance sensor 1400 illustrated in FIG. 1, and the parameter setting unit 1106 sets information of the humidity as the environmental parameter. Further, in other processes in the third variation, a form is employed in which "the information of the humidity" is applied instead of "the information of the illuminance" in the first exemplary embodiment.

As described above, in the first exemplary embodiment (including the first to third variations), if the difference between the first environmental parameter when the map is generated (first time point) and the second environmental parameter when mixed reality is experienced (second time point) is greater than the reference value, the difference determination unit 1110 controls the notification unit 1500 to notify the user of a warning that the accuracy of self-position estimation performed by the self-position estimation unit 1103 may decrease.

According to such a configuration, in a case where it is assumed that the accuracy of self-position estimation performed by the self-position estimation unit 1103 decreases, it is possible to prevent mixed reality from being experienced based on the self-position estimation.

Next, a second exemplary embodiment of the present disclosure is described.

Figure 5:
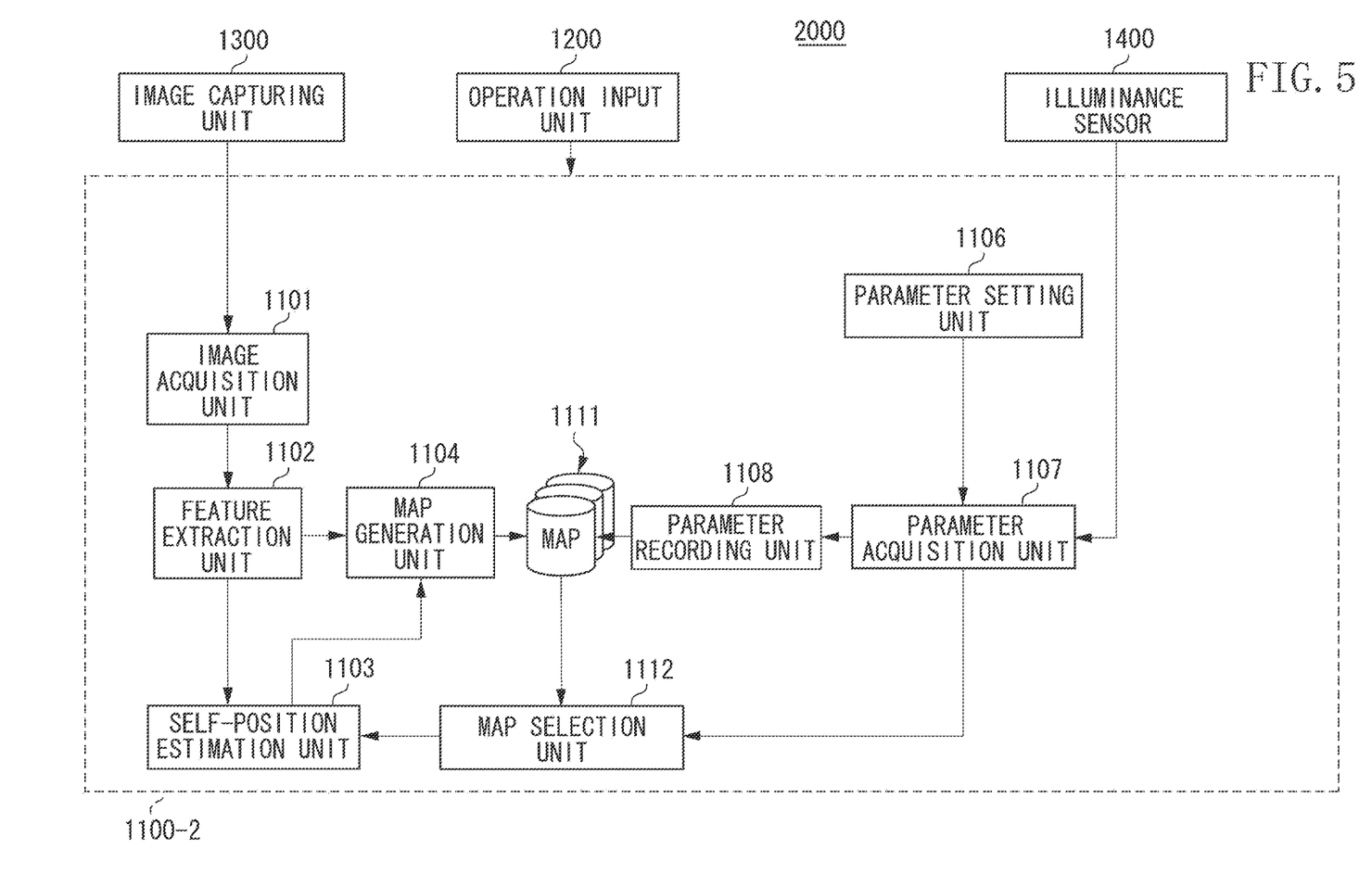
FIG. 5 is a block diagram illustrating an example of a functional configuration of an information processing system according to one or more aspects of the present disclosure.

FIG. 5 is a block diagram illustrating an example of a functional configuration of an information processing system 2000 according to the second exemplary embodiment of the present disclosure. As illustrated in FIG. 5, the information processing system 2000 according to the present exemplary embodiment includes an information processing apparatus 1100, an operation input unit 1200, an image capturing unit 1300, and an illuminance sensor 1400. In this specification, the information processing apparatus 1100 illustrated in FIG. 5 is referred to as an "information processing apparatus 1100-2". Further, as illustrated in FIG. 5, the information processing apparatus 1100-2 includes functional components such as an image acquisition unit 1101, a feature extraction unit 1102, a self-position estimation unit 1103, a map generation unit 1104, maps 1111, a parameter setting unit 1106, a parameter acquisition unit 1107, a parameter recording unit 1108, and a map selection unit 1112. In FIG. 5, components similar to those illustrated in FIG. 1 are designated by the same signs, and are not described in detail here.

The information processing apparatus 1100-2 is described below. Also in the second exemplary embodiment, similar to the first exemplary embodiment, an example is described where information of the illuminance is acquired as an environmental parameter indicating the environment of the real space. The present disclosure, however, is not limited thereto.

Based on input information from the operation input unit 1200, the image acquisition unit 1101 acquires an image regarding the real space from the image capturing unit 1300. The feature extraction unit 1102 extracts a feature in the image from the image acquired by the image acquisition unit 1101.

When a map is generated (first time point), the self-position estimation unit 1103 performs self-position estimation for estimating the position of the image capturing unit 1300 in the real space, using the feature extracted by the feature extraction unit 1102. Further, at a time of mixed reality experience (second time point) after the map is generated (first time point), the self-position estimation unit 1103 performs self-position estimation for estimating the position of the image capturing unit 1300 in the real space, using the feature extracted by the feature extraction unit 1102 at the time of the experience and map information obtained from a map selected by the map selection unit 1112.

Based on input information from the operation input unit 1200 and using the feature extracted by the feature extraction unit 1102 and the position of the image capturing unit 1300 estimated by the self-position estimation unit 1103, the map generation unit 1104 generates a plurality of maps 1111 of the feature that correspond to a plurality of environmental conditions in the real space. More specifically, in the present exemplary embodiment, the map generation unit 1104 generates the plurality of maps 1111 corresponding to a plurality of illuminance conditions in the real space.

Based on input information from the operation input unit 1200, the parameter setting unit 1106 sets an environmental parameter indicating the environment of the real space. More specifically, in the present exemplary embodiment, the parameter setting unit 1106 sets information of the illuminance as the environmental parameter.

According to the environmental parameter set by the parameter setting unit 1106, the parameter acquisition unit 1107 acquires environmental parameters indicating the environment (i.e., the illuminance in the present exemplary embodiment) and regarding the plurality of environmental conditions in the real space. More specifically, when the map is generated (first time point), based on input information from the operation input unit 1200, the parameter acquisition unit 1107 acquires a plurality of environmental parameters (a plurality of first environmental parameters) with respect to the respective plurality of environmental conditions for generating the plurality of maps 1111. Further, at the time of mixed reality experience (second time point), based on input information from the operation input unit 1200, the parameter acquisition unit 1107 acquires an environmental parameter (second environmental parameter) in the real space at the time of the experience.

The parameter recording unit 1108 records the plurality of environmental parameters (plurality of first environmental parameters) acquired by the parameter acquisition unit 1107 when the map is generated (first time point), in association with the plurality of maps 1111 corresponding to the environmental conditions. More specifically, in the present exemplary embodiment, the parameter recording unit 1108 records a plurality of pieces of information of the illuminance acquired as the plurality of first environmental parameters by the parameter acquisition unit 1107, in association with the plurality of maps 1111 corresponding to the illuminance conditions. To record the plurality of first environmental parameters in association with the plurality of maps 1111 corresponding to the first environmental parameters, a form may be used in which the parameter recording unit 1108 records the environmental parameters within the maps 1111 corresponding to the environmental parameters, or a form may be used in which the parameter recording unit 1108 records the environmental parameters as information separate from the maps 1111 corresponding to the environmental parameters.

Based on the second environmental parameter acquired by the parameter acquisition unit 1107 at the time of mixed reality experience (second time point), the map selection unit 1112 selects a single map from among the plurality of maps 1111. More specifically, the map selection unit 1112 selects, as the single map from among the plurality of maps 1111, a map recorded in association with the first environmental parameter (information of the illuminance) having the closest relationship with the second environmental parameter (information of the illuminance).

The hardware configuration of the information processing system 2000 illustrated in FIG. 5 is similar to the hardware configuration of the information processing system 1000 according to the first exemplary embodiment illustrated in FIG. 2. In this case, for example, the functional components 1101 to 1104, 1106 to 1108, 1111, and 1112 of the information processing apparatus 1100-2 illustrated in FIG. 5 are realized by the CPU 1121 illustrated in FIG. 2 loading a program stored in the ROM 1123 into the RAM 1122 and executing the program. For example, to configure hardware as an alternative to a software process using the CPU 1121, a form is also applicable in which a calculation unit and a circuit unit corresponding to the processing of the functional components 1101 to 1104, 1106 to 1108, 1111, and 1112 of the information processing apparatus 1100-2 illustrated in FIG. 5 are configured.

Figure 6:
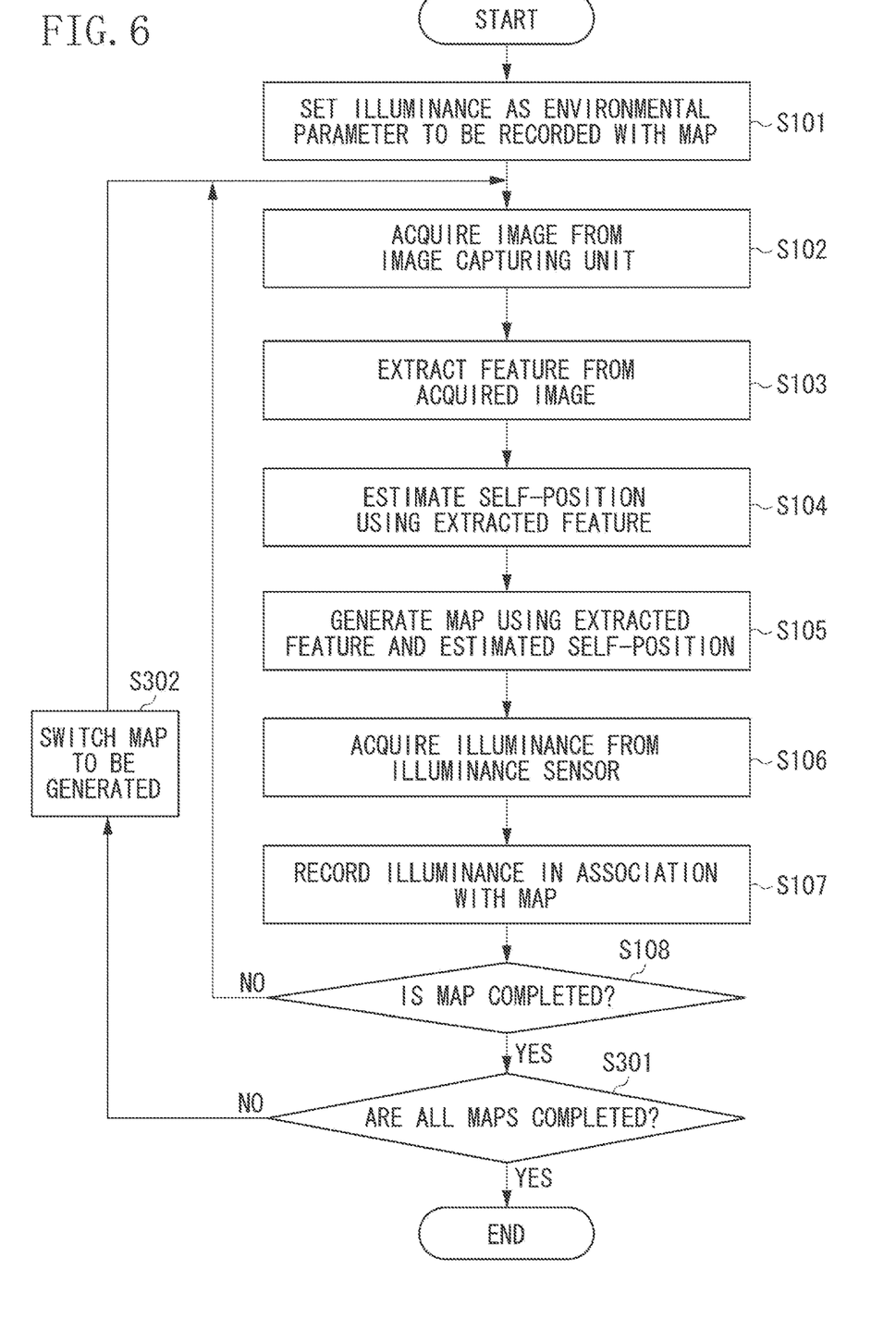
FIG. 6 is a flowchart illustrating an example of a processing procedure performed by an information processing apparatus according to one or more aspects of the present disclosure when a map is generated (first time point).
Figure 7:
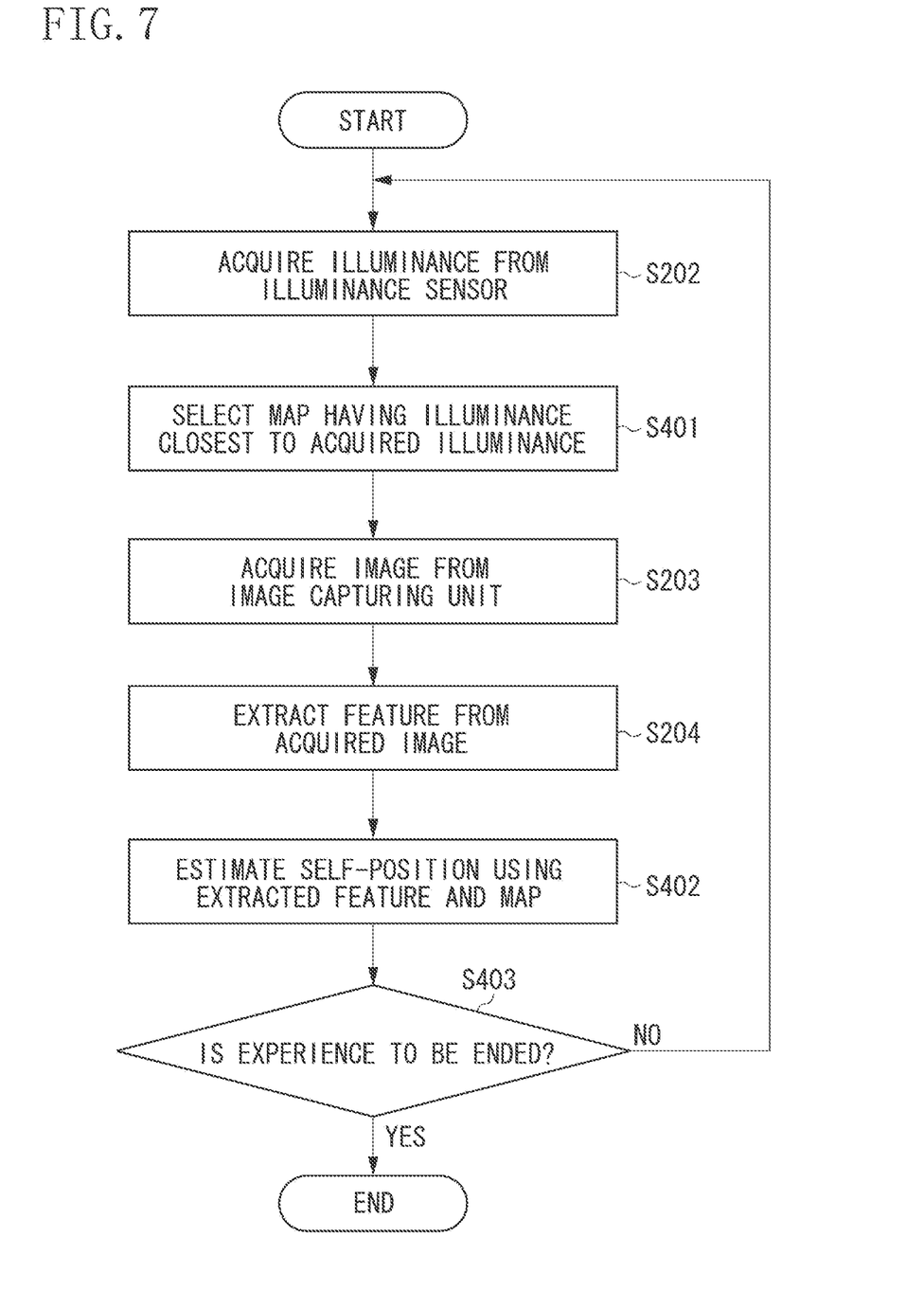
FIG. 7 is a flowchart illustrating an example of a processing procedure performed by the information processing apparatus according to one or more aspects of the present disclosure at a time of mixed reality experience (second time point).

Next, with reference to FIGS. 6 and 7, a description is given of a processing procedure of an information processing method performed by the information processing apparatus 1100-2 illustrated in FIG. 5.

FIG. 6 is a flowchart illustrating an example of a processing procedure performed by the information processing apparatus 1100-2 according to the second exemplary embodiment when the map is generated (first time point). In FIG. 6, processing steps similar to those illustrated in FIG. 3 are designated by the same step numbers.

First, similar to the first exemplary embodiment illustrated in FIG. 3, the processes of steps S101 to S108 are performed regarding a certain illuminance condition.

As a result of the determination in step S108, if a map in the certain illuminance condition is completed (YES in step S108), the processing proceeds to step S301.

In step S301, the information processing apparatus 1100-2 (e.g., map generation unit 1104) determines whether the plurality of maps 1111 regarding a plurality of illuminance conditions specified based on, for example, input information from the operation input unit 1200 are completed. The plurality of illuminance conditions may be conditions optionally determined by the user or conditions defined for each image capturing unit 1300.

As a result of the determination in step S301, if the plurality of maps 1111 are not yet completed (NO in step S301), the processing proceeds to step S302.

In step S302, the information processing apparatus 1100-2 (e.g., map generation unit 1104) changes the current illuminance condition to an illuminance condition regarding which the processing has not yet been performed, thereby switching the map to be generated. Then, the processing returns to step S102, and the processes of step S102 and the subsequent steps are performed again. In the processes of step S302 and subsequent steps, the information processing apparatus 1100-2 saves the map generated in step S105 and the information of the illuminance recorded in step S107, at a location different from that for the map and the information of the illuminance obtained in the previous processing. Further, maps regarding different illuminance conditions may not need to be successively generated.

On the other hand, as a result of the determination in step S301, if the plurality of maps 1111 are completed (YES in step S301), the processing in the flowchart illustrated in FIG. 6 ends.

FIG. 7 is a flowchart illustrating an example of a processing procedure performed by the information processing apparatus 1100-2 according to the second exemplary embodiment at the time of mixed reality experience (second time point). In FIG. 7, processing steps similar to those illustrated in FIG. 4 are designated by the same step numbers.

When the processing in the flowchart illustrated in FIG. 7 is started, first, similar to step S202 in FIG. 4, according to the environmental parameter set by the parameter setting unit 1106, the parameter acquisition unit 1107 acquires information of the illuminance as an environmental parameter indicating the environment of the real space from the illuminance sensor 1400. The information of the illuminance acquired in step S202 corresponds to the second environmental parameter acquired at the time of mixed reality experience (second time point).

Next, in step S401, the map selection unit 1112 selects, from among the plurality of maps 1111, a map recorded in association with the first environmental parameter (information of the illuminance) having the closest relationship with the second environmental parameter (information of the illuminance) acquired in step S202. In the process of step S401, the map selection unit 1112 may select a map having the closest illuminance average of the entire map to the current illuminance (at the time of the experience), or may select a map of which a reference point has the closest illuminance to the current illuminance (at the time of the experience). Alternatively, self-position estimation may be performed without using the maps, and the map selection unit 1112 may select a map on which a corresponding point has the closest illuminance to the current illuminance (at the time of the experience). Then, self-position estimation may be performed again.

Next, similar to step S203 in FIG. 4, based on input information from the operation input unit 1200, the image acquisition unit 1101 acquires an image regarding the real space from the image capturing unit 1300.

Next, similar to step S204 in FIG. 4, the feature extraction unit 1102 extracts a feature in the image from the image acquired in step S203.

Next, in step S402, using the feature extracted in step S204 and map information obtained from the map selected in step S401, the self-position estimation unit 1103 performs self-position estimation for estimating the position of the image capturing unit 1300 in the real space at the time of the experience.

Next, in step S403, based on input information from the operation input unit 1200, the information processing apparatus 1100-2 determines whether the experience of mixed reality is to be ended. As a result of this determination, if the experience of mixed reality is not to be ended (NO in step S403), the processing returns to step S202. Then, the processes of step S202 and the subsequent steps are performed again.

On the other hand, as a result of the determination in step S403, if the experience of mixed reality is to be ended (YES in step S403), the processing in the flowchart illustrated in FIG. 7 ends.

In the above description of the second exemplary embodiment, information of the illuminance is acquired as an environmental parameter indicating the environment of the real space. In a first variation of the second exemplary embodiment, information of the temperature is acquired as the environmental parameter. In the first variation, a form is employed in which a temperature sensor is applied instead of the illuminance sensor 1400 illustrated in FIG. 5, and the parameter setting unit 1106 sets information of the temperature as the environmental parameter. Further, in other processes in the first variation, a form is employed in which "the information of the temperature" is applied instead of "the information of the illuminance" in the second exemplary embodiment.

In a second variation of the second exemplary embodiment, information of the internal temperature of the image capturing unit 1300 is acquired as an environmental parameter indicating the environment of the real space. In the second variation, a form is employed in which a temperature sensor is applied within the image capturing unit 1300 instead of the illuminance sensor 1400 illustrated in FIG. 5, and the parameter setting unit 1106 sets information of the internal temperature of the image capturing unit 1300 as the environmental parameter. Further, in other processes in the second variation, a form is employed in which "the information of the internal temperature of the image capturing unit 1300" is applied instead of "the information of the illuminance" in the second exemplary embodiment. In the second variation, the information of the internal temperature of the image capturing unit 1300 recorded in step S107 in FIG. 6 may not need to correspond respectively to points on each of the plurality of maps 1111.

In a third variation of the second exemplary embodiment, information of the humidity is acquired as an environmental parameter indicating the environment of the real space. In the third variation, a form is employed in which a humidity sensor is applied instead of the illuminance sensor 1400 illustrated in FIG. 5, and the parameter setting unit 1106 sets information of the humidity as the environmental parameter. Further, in other processes in the third variation, a form is employed in which "the information of the humidity" is applied instead of "the information of the illuminance" in the second exemplary embodiment.

As described above, in the second exemplary embodiment (including the first to third variations), the map selection unit 1112 selects a single map from among the plurality of maps 1111 based on the second environmental parameter acquired by the parameter acquisition unit 1107 at the time of mixed reality experience (second time point) after the map is generated (first time point). More specifically, the map selection unit 1112 selects, from among the plurality of maps 1111, a map recorded in association with the first environmental parameter having the closest relationship with the second environmental parameter. Then, using a feature extracted by the feature extraction unit 1102 at the time of mixed reality experience and map information obtained from the map selected by the map selection unit 1112, the self-position estimation unit 1103 estimates the position of the image capturing unit 1300 in the real space at the time of mixed reality experience.

According to such a configuration, it is possible to prevent a decrease in the accuracy of self-position estimation performed by the self-position estimation unit 1103. As a result, it is possible to prevent mixed reality from being experienced based on the self-position estimation with decreased accuracy.

Other Exemplary Embodiments

The present disclosure can also be implemented by the process of supplying a program for implementing one or more functions of the above exemplary embodiments to a system or an apparatus via a network or a storage medium, and of causing one or more processors of a computer of the system or the apparatus to read and execute the program. Further, the present disclosure can also be achieved by a circuit (e.g., an application-specific integrated circuit (ASIC)) for achieving the one or more functions.

Further, this program and a computer-readable storage medium storing the program are included in the present disclosure.

All the above exemplary embodiments of the present disclosure merely illustrate specific examples for carrying out the present disclosure, and the technical scope of the present disclosure should not be interpreted in a limited manner based on these exemplary embodiments. In other words, the present disclosure can be carried out in various manners without departing from the technical idea or the main feature of the present disclosure.

According to the exemplary embodiments described above, in a case where the environment of a real space differs greatly between the time when a map is created (first time point) and the time when mixed reality is experienced (second time point) after the time when the map is created, it is possible to prevent a decrease in the accuracy of the estimation of the position of an image capturing unit.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-115309, filed Jun. 12, 2017, which is hereby incorporated by reference herein in its entirety.

What is claimed is:

1. An information processing apparatus, comprising:
one or more hardware processors; and
one or more memories which store instructions executable by the one or more hardware processors to cause the information processing apparatus to function as:
an operation input unit configured to input information to the information processing apparatus according to an operation of an observer as a user;
a reference value setting unit configured to set a reference value based on the input information from the operation unit;
an image acquisition unit configured to acquire an image obtained by capturing a real space using an image capturing unit;
an extraction unit configured to extract a feature from the image;
an estimation unit configured to, based on the feature, estimate a position of the image capturing unit in the real space;

a generation unit configured to, based on the feature and the estimated position of the image capturing unit, generate a map of the feature in the real space;

a parameter acquisition unit configured to acquire an environmental parameter indicating an environment of the real space;

a recording unit configured to record a first environmental parameter, which is the environmental parameter acquired at a first time point when the map is generated, in association with the map; and a determination unit configured to, based on the first environmental parameter and a second environmental parameter, which is the environmental parameter acquired at a second time point after the first time point, determine whether the map can be used based on the first environmental parameter and a second environmental parameter being compared to the reference value.

2. The information processing apparatus according to claim 1, wherein the determination unit obtains a difference between the first and second environmental parameters, and in a case where the difference is less than or equal to a reference value, the determination unit determines that the map can be used.

3. The information processing apparatus according to claim 1, wherein in a case where the determination unit determines that the map can be used, then based on the feature extracted by the extraction unit at the second time point and the map, the estimation unit estimates the position of the image capturing unit at the second time point.

4. The information processing apparatus according to claim 1, further comprising a notification unit configured to, in a case where the determination unit determines that the map cannot be used, issue a notification.

5. The information processing apparatus according to claim 1, further comprising a selection unit configured to select a type of an environmental parameter to be acquired by the parameter acquisition unit.

6. The information processing apparatus according to claim 1, wherein the parameter acquisition unit acquires information of illuminance as the environmental parameter.

7. The information processing apparatus according to claim 1, wherein the parameter acquisition unit acquires information of temperature as the environmental parameter.

8. The information processing apparatus according to claim 1, wherein the parameter acquisition unit acquires information of humidity as the environmental parameter.

9. An information processing apparatus, comprising:
one or more hardware processors; and
one or more memories which store instructions executable by the one or more hardware processors to cause the information processing apparatus to function as:
an operation input unit configured to input information to the information processing apparatus according to an operation of an observer as a user;
a reference value setting unit configured to set the reference value based on the input information;
an image acquisition unit configured to acquire an image obtained by capturing a real space using an image capturing unit;
an extraction unit configured to extract a feature from the image;
an estimation unit configured to, based on the feature, estimate a position of the image capturing unit in the real space;
a generation unit configured to, based on the feature and the estimated position of the image capturing unit, generate a plurality of maps of the feature that correspond respectively to a plurality of environmental conditions in the real space;

a parameter acquisition unit configured to acquire a plurality of environmental parameters respectively indicating environments regarding the plurality of environmental conditions in the real space;

a recording unit configured to record a plurality of first environmental parameters, which are the plurality of environmental parameters respectively acquired with respect to the plurality of environmental conditions at a first time point when the plurality of maps are generated, in association with the plurality of maps respectively corresponding to the plurality of first environmental parameters; and a selection unit configured to, based on a second environmental parameter, which is one of the environmental parameters acquired at a second time point after the first time point, select a single map from among the plurality of maps based on the first environmental parameter and a second environmental parameter being compared to the reference value, wherein based on the feature extracted by the extraction unit at the second time point and the map selected by the selection unit, the estimation unit estimates the position of the image capturing unit at the second time point.

10. The information processing apparatus according to claim 9, wherein the selection unit selects, as the single map, one of the maps recorded in association with one of the first environmental parameters having the closest relationship with the second environmental parameter.

11. The information processing apparatus according to claim 9, further comprising a selection unit configured to select a type of an environmental parameter to be acquired by the parameter acquisition unit.

12. The information processing apparatus according to claim 9, further comprising a condition setting unit configured to set the plurality of environmental conditions.

13. The information processing apparatus according to claim 9, wherein the parameter acquisition unit acquires information of illuminance as each of the environmental parameters.

14. The information processing apparatus according to claim 9, wherein the parameter acquisition unit acquires information of temperature as each of the environmental parameters.

15. The information processing apparatus according to claim 9, wherein the parameter acquisition unit acquires information of humidity as each of the environmental parameters.

16. An information processing method, comprising:
inputting information to the information processing apparatus according to an operation of an observer as a user;
setting a reference value based on the input information;
acquiring an image obtained by capturing a real space using an image capturing unit;
extracting a feature from the image;
estimating, based on the feature, a position of the image capturing unit in the real space;
generating, based on the feature and the estimated position of the image capturing unit, a map of the feature in the real space;
acquiring an environmental parameter indicating an environment of the real space;

recording a first environmental parameter, which is the environmental parameter acquired at a first time point when the map is generated, in association with the map; and determining whether the map can be used based on the first environmental parameter and a second environmental parameter, which is the environmental parameter acquired at a second time point after the first time point, being compared to the reference value.

17. An information processing method, comprising:

inputting information to the information processing apparatus according to an operation of an observer as a user;

setting a reference value based on the input information;

acquiring an image obtained by capturing a real space using an image capturing unit;

extracting a feature from the image;

estimating, based on the feature, a position of the image capturing unit in the real space;

generating, based on the feature and the estimated position of the image capturing unit, a plurality of maps of the feature that respectively correspond to a plurality of environmental conditions in the real space;

acquiring a plurality of environmental parameters respectively indicating environments regarding the plurality of environmental conditions in the real space;

recording a plurality of first environmental parameters, which are the plurality of environmental parameters respectively acquired with respect to the plurality of environmental conditions at a first time point when the plurality of maps are generated, in association with the plurality of maps respectively corresponding to the plurality of first environmental parameters; and selecting a single map from among the plurality of maps, based on a second environmental parameter, which is one of the environmental parameters acquired at a second time point after the first time point, being compared to the reference value, estimating the position of the image capturing unit at the second time point, based on the feature extracted at the second time point and the selected map.

18. A non-transitory computer-readable storage medium storing a program for causing a computer to execute an information processing method, the method comprising:

inputting information to the information processing apparatus according to an operation of an observer as a user;

setting a reference value based on the input information;

acquiring an image obtained by capturing a real space using an image capturing unit;

extracting a feature from the image;

estimating, based on the feature, a position of the image capturing unit in the real space;

generating, based on the feature and the estimated position of the image capturing unit, a map of the feature in the real space;

acquiring an environmental parameter indicating an environment of the real space;

recording a first environmental parameter, which is the environmental parameter acquired at a first time point when the map is generated, in association with the map; and determining whether the map can be used based on the first environmental parameter and a second environmental parameter, which is the environmental parameter acquired at a second time point after the first time point, being compared to the reference value.

19. A non-transitory computer-readable storage medium storing a program for causing a computer to execute an information processing method, the method comprising:

inputting information to the information processing apparatus according to an operation of an observer as a user;

setting a reference value based on the input information;

acquiring an image obtained by capturing a real space using an image capturing unit;

extracting a feature from the image;

estimating, based on the feature, a position of the image capturing unit in the real space;

generating, based on the feature and the estimated position of the image capturing unit, a plurality of maps of the feature that respectively correspond to a plurality of environmental conditions in the real space;

acquiring a plurality of environmental parameters respectively indicating environments regarding the plurality of environmental conditions in the real space;

recording a plurality of first environmental parameters, which are the plurality of environmental parameters respectively acquired with respect to the plurality of environmental conditions at a first time point when the plurality of maps are generated, in association with the plurality of maps respectively corresponding to the plurality of first environmental parameters; and selecting a single map from among the plurality of maps, based on a second environmental parameter, which is one of the environmental parameters acquired at a second time point after the first time point, being compared to the reference value, estimating the position of the image capturing unit at the second time point, based on the feature extracted at the second time point and the selected map.

\* \* \* \* \*